United States Patent [19]

Haslbeck

[11] 4,335,271
[45] Jun. 15, 1982

[54] ELECTRICAL BOX

[75] Inventor: Joseph Haslbeck, West Vancouver, Canada

[73] Assignee: Highland Mfg. Company Ltd., Burnaby, Canada

[21] Appl. No.: 113,850

[22] Filed: Jan. 21, 1980

[30] Foreign Application Priority Data

Feb. 20, 1979 [CA] Canada .................................. 321962

[51] Int. Cl.³ ............................................. H02G 3/08
[52] U.S. Cl. .................................. 174/65 R; 220/3.2;
339/103 R
[58] Field of Search ................. 174/65 R, 53; 220/3.2,
220/3.3, 3.4, 3.5, 3.6, 3.7, 3.8, 3.9, 3.92, 3.94;
339/103 R, 103 B, 103 C, 107

[56] References Cited

U.S. PATENT DOCUMENTS 3,863,021  1/1975  Schindler et al. ....................... 174/53
4,202,457  5/1980  Tansi ..................................... 220/3.3

FOREIGN PATENT DOCUMENTS 577589  6/1959  Canada ............................. 174/65 R Primary Examiner—B. A. Reynolds
Assistant Examiner—D. A. Tone
Attorney, Agent, or Firm—Fulwider, Patton, Rieber, Lee & Utecht

[57] ABSTRACT

An electrical box. The box has a cable inlet opening. A flap is mounted within the opening at a first edge of the opening to tend to resile to the closed position. An indent in the edge of the flap, remote from the mount, contacts and grips a cable when such a cable is positioned in the inlet opening. The edge of the opening adjacent the indent is substantially non-deformable by a cable forced into the inlet. The box can be molded in one piece in most embodiments and a cable can be positioned in it without the use of tools.

7 Claims, 5 Drawing Figures

ELECTRICAL BOX

FIELD OF THE INVENTION

This invention relates to an electrical switch or outlet box.

DESCRIPTION OF THE PRIOR ART

Outlet boxes are well known in the electrical art. They are positioned where an outlet or a switch is required. The cable of an electrical circuit is let into the box and attached to the switch or outlet in the box. The box is provided with location means for the switch or outlet within it and with means to attach the box to the structure of a building. Ground straps are also usually provided.

A relatively recent trend in these outlet boxes is their manufacture from plastic. Such boxes are typically made from thermoplastic resins with flame retarding agents incorporated. The use of thermosetting resins is, however, also known.

All outlet boxes are provided with at least one hole, usually in a side wall. The conductors of the circuit enter the box through that hole. Each hole normally has associated with it a clamp to prevent external movement of the conductor loosening a connection made within the box. It was a standard practice to position such clamps within the box but a recent development has been to position the clamps outside the box in order to conserve space within the box to facilitate the making of the electrical connections.

Many of the prior art clamps are metal and usually feature flanges having screws in them so that two parts of the clamp can be screwed together to provide a tight fit over the conductor. However, a recent development has been the use of clamps that are not of metal and furthermore do not require screws. That is the cable can be forced into a clamp and held in position without the use of any tools, for example a screwdriver. Examples of this latter group of outlet boxes are described and claimed in our Canadian Pat. Nos. 1,016,644 issued Aug. 30th, 1977 and 1,052,898, issued Apr. 17th, 1979.

SUMMARY OF THE INVENTION

The present invention seeks to provide an outlet box that is extremely simple in structure and, in particular, can be made in one piece, including the clamping means. It is not essential that the clamping means be integral with the remainder of the box but in preferred aspects of the invention the clamping means are molded integrally with the remainder of the structure. An advantage of this arrangement is the ease of production and the fact that there are no components to be lost during storage or installation of the outlet box.

Accordingly, in a first aspect, the present invention is an electrical box comprising an opening for a cable formed in the box; a flap positioned within the opening and resiliently, hingedly mounted at a first edge of the opening to tend to resile to the closed position; an indent in the edge of the flap, remote from the hinged mount, to contact and grip a cable positioned in the opening; the edge of the opening adjacent said indent being substantially non-deformable by a cable forced into the inlet.

It is desirable that there be a lip projecting into the box from a direction opposite the free end of the flap, remote from the first edge of the opening. Such a lip preferably has an arcuate, upper edge to engage the plastic insulation sheath of a typical modern cable.

It is desirable that there be a wall formed in the interior of the box, adjacent one side of the opening to prevent unwanted entry into the box when a cable is in position. When a cable is in position the flap is forced into the box, which would leave a gap at the side. Contaminants could enter if the wall were not present and, for example, a screwdriver or similar foreign object could be forced in. Particularly where a number of circuits enter the box this could produce a short circuit. It is also desirable that there be a small, flexible flap positioned in the indent again to prevent ingress of contaminants or foreign objects if the indent does not make complete contact with the cable and to keep the inlet substantially closed if the inlet is not in use, for example in a box with a plurality of inlets.

BRIEF DESCRIPTION OF DRAWINGS

Aspects of the invention are illustrated, merely by way of example, in the accompanying drawings in which.

DESCRIPTION OF PREFERRED EMBODIMENTS

Figure 1:
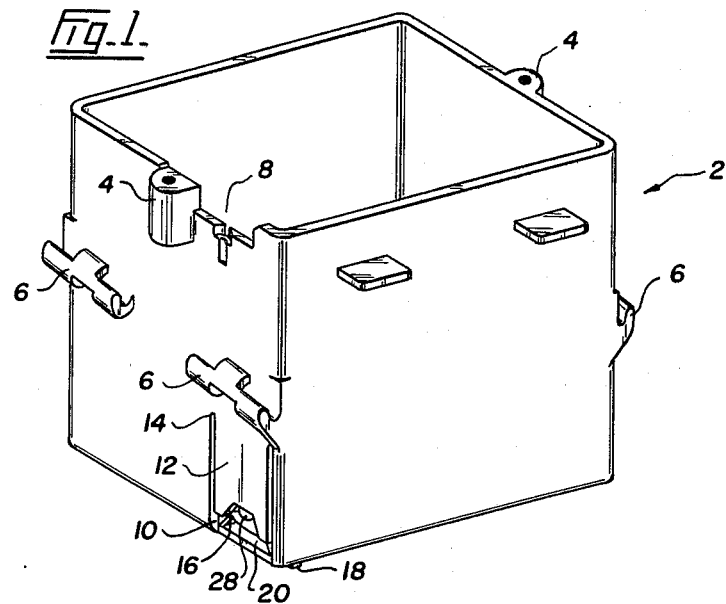
FIG. 1 is a perspective view of an electrical box according to the present invention.

The drawings illustrate an electrical box 2. As is conventional in the art the box 2 has internally threaded lugs 4 to locate a switch or outlet. There are projections 6 on the sides of the box 2 to receive nails so that the box 2 may be located in a building, for example, on a wooden stud.

There is an indent 8 in one wall of the box to receive a ground strap (not shown).

All the above features are conventional and will not be further discussed. It should be noted that in the box according to the present invention any known method of locating the outlet or switch in the box can be used and that any means of attaching the box in a building can be used.

In accordance with the invention the box 2 is provided with an opening 10 for a cable. There is a flap 12 positioned within the opening 10 and resiliently hingedly mounted at 14 to the upper edge of the opening 10 to tend to resile to the closed position, the position illustrated in FIG. 1. There is an indent 16 in the edge of the flap 12, remote from the hinged mount 14, to contact and grip a cable (not shown) when such a cable is positioned in the opening 10. The edge of the opening 10 adjacent the indent 14 is substantially nondeformable when a cable is forced into the opening. If the edge is deformed then the downward force of the flap 12 is dissipated in distortion of the edge. The base of the box 2 can therefore be formed of a reasonably thick plastic. A better solution, in the interest of economy, is to form the box 2 with a short reinforcing rib 18 at the portion of the box 2 adjacent the indent 16 in the flap 12 so that the portion is non-deformable.

Figure 2:
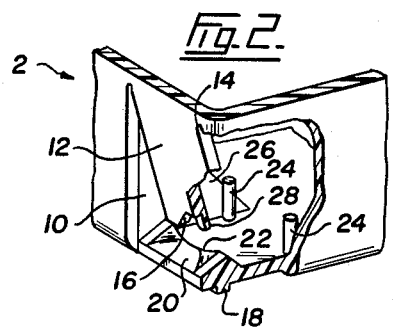
FIG. 2 is a detail of the box of FIG. 1 showing the flap moved inward.

As shown most clearly in FIG. 2 there is a lip 20 projecting into the box 2 adjacent the indent 16. In the FIG. 2 embodiment the lip 20 has an arcuate, upper edge 22 to engage the plastic insulation sheath of a cable.

There are stops 24 positioned within the box to restrict the inward movement of the flap 12. Excessive movement of the flap 12 could cause its breakage at the hinge 14.

There is a wall 26 formed in the interior of the box 2 adjacent one side of the opening 10. The wall 26 prevents ingress of contaminants into the box 2 when a cable is in position. The cable forces the flap 12 backwardly but because of the presence of wall 26 the box remains substantially closed to contaminants or foreign objects. It should be noted that in all the illustrated embodiments the opening 10 is formed adjacent a corner of the box 2. This means that only one wall 26 is required. If the opening 10 were positioned remote from a corner of the box 2 then walls 26 would be provided on both sides of the opening.

There is a small, flexible flap 28 positioned in the indent 16 to prevent ingress of contaminants again when a cable is in position in the box 2. Such a cable may not correspond precisely with the shape of the indent 16 and the small flexible flap 28 therefore contacts the cable to maintain the box 2 free of contaminants. If opening 10 is not in use the flap 28 also helps to close off the opening.

Figure 3:
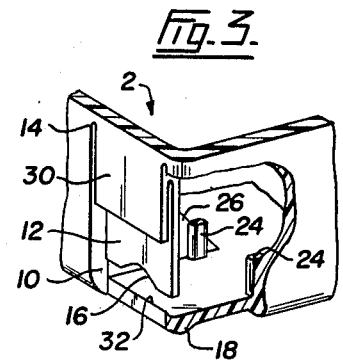
FIG. 3 is a detail of a further embodiment of the invention.

FIG. 3 illustrates an embodiment of the invention that differs from the embodiment of FIGS. 1 and 2 by the provision of a non-resilient outer flap 30, positioned outside the resiliently hinged flap 12 to limit outward movement of the resiliently hinged flap 12 on withdrawing a cable from the box. The FIG. 3 embodiment also has a lip 32 projecting upwardly in the direction of the flap on the edge of the opening 10. The lip 32 of FIG. 3 is not arcuate and has the advantage of simplicity of formation.

Figure 4:
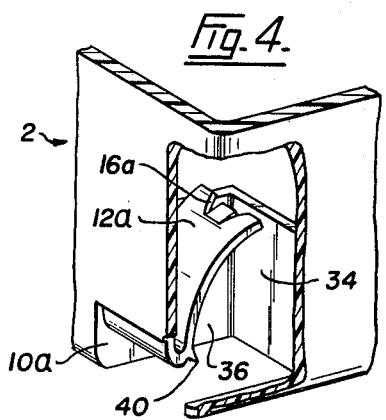
FIG. 4 is a detail of a further embodiment of the invention.

In the embodiment of FIG. 4, there is an opening 10a at one corner of the box 2. There is a rectangular pathway extending a short distance into the box 2 from the opening and defined by two walls of the box 2 and two walls 34 and 36 formed to extend from the two walls of the box 2 to meet each other to complete the pathway. There is a resilient arcuate flap 12a attached to one of the walls of the box adjacent the opening 10a. The flap 12a extends inwardly and across the pathway to a point adjacent an end of the pathway. It has an indent 16a. A cable in the pathway is positioned by the illustrated walls and clamped in that position by the flap 12a. To facilitate that clamping action an edge 40 is formed on the flap 12a, adjacent the hinged joint, to grip the plastic insulation sheath of a cable positioned in the pathway.

Figure 5:
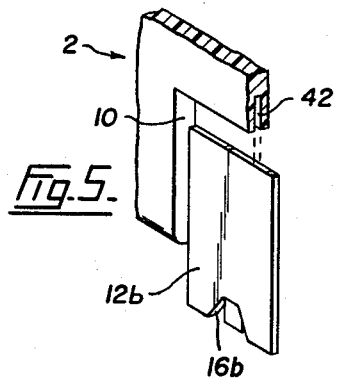
FIG. 5 is a detail of a further embodiment of the invention.

The embodiment of FIG. 5 shows a flap 12b formed separately from the remainder of the box 2 and having an indent 16b. To permit this there is a slot 42 formed in the first edge of the opening 10 to receive the flap 12b. This embodiment permits the flap 12b and the box 2 to be made of different materials.

With all the illustrated embodiments the box is first located in the desired position. A cable is simply pushed from the outside of a box past the resiliently hinged flap and into the box so that the necessary connection can be made. The flap is such that it tends to resile to the closed position and therefore acts to locate the upper surface of the cable. At the same time it forces the cable onto the lip further anchoring the cable in position.

Thus the electrical box of the present invention is extremely simple to use. All the embodiments of FIGS. 1 to 4 can be molded in one step. Typically such a box will be made of any of the known materials useful in the production of a plastic electrical outlet boxes. Flame retardant agents will normally be incorporated in accordance with required practice.

In the embodiment of FIG. 5 the box may be made of a thermosetting resin, again of the type known for making plastic electrical boxes, but the flap 12 is made of a thermoplastic material in order to incorporate the necessary resilient properties.

The boxes of the present invention are simple to make and easy to use. Their use does not require any special tools to operate a clamp, not even a screwdriver. Further, prior art clamps exert a constant, quite high force to the insulating sheath. In the present invention the applied force is normally directly proportional to the load on the wire, which is not normally high.

I claim:

1. An electrical box molded in one piece from a plastic material and comprising:
   a cable inlet opening formed in the box;
   a flap positioned within the opening and resiliently hingedly mounted at a first edge of the opening to tend to resile to the closed position;
   stops positioned within the box to restrict the inward movement of the flap;
   an indent in the edge of the flap, remote from the hinged mount, to contact and grip a cable when such a cable is positioned in the inlet opening;
   a lip projecting into the box from that edge of opening remote from the first edge of the opening, the flap acting to force the cable against the lip; and
   the edge of the opening adjacent said indent being substantially non-deformable by a cable forced into the inlet.

2. An electrical box as claimed in claim 1 in which the lip has an arcuate upper edge to engage the plastic insulation sheath of a cable.

3. An electrical box as claimed in claim 1 in which the inlet is formed adjacent a corner of the box;
   a wall formed in the interior of the box, adjacent one side of the opening, to prevent ingress of contaminants into the box when a cable is in position and the flap thus moved inwardly from the closed position.

4. An electrical box as claimed in claim 1 including a substantially non-resilient outer flap positioned outside the resiliently hinged flap to limit outward movement of the resiliently hinged flap on withdrawing a cable from the box.

5. An electrical box as claimed in claim 1 in which the portion of the box adjacent said indent that is substantially non-deformable by a cable forced into the inlet is rendered substantially non-deformable by a reinforcing rib formed on its exterior surface.

6. An electrical box as claimed in claim 1 including a flexible flap positioned in the indent to prevent ingress of contaminants.

7. An electrical box of a plastic material molded in one piece and comprising an opening adjacent a corner of the box forming a cable inlet opening into the box;
   a first flap positioned within the opening and resiliently hingedly mounted at a first edge of the opening to tend to resile to the closed position;

an indent in the edge of the flap, remote from the hinged mount, to contact and grip a cable when such a cable is positioned in the opening;

a second flap positioned in the indent to help seal the box;

an edge projecting into the box from a position just inside the box, behind the cable inlet opening and remote from the first edge of the opening;

a reinforcing rib formed on the exterior of the box opposite the edge; and stops positioned within the box to prevent the excessive inward movement of the resiliently hinged flap.

* * * * *

REEXAMINATION CERTIFICATE (1245th)

United States Patent [19]

Haslbeck

[11] B1 4,335,271

[45] Certificate Issued  Apr. 10, 1990

[54] ELECTRICAL BOX

[75] Inventor: Joseph Haslbeck, West Vancouver, Canada

[73] Assignee: Hubbell Incorporated

Reexamination Request:
No. 90/001,734, Mar. 27, 1989

Reexamination Certificate for:
Patent No.: 4,335,271
Issued: Jun. 15, 1982
Appl. No.: 113,850
Filed: Jan. 21, 1980

[30]  Foreign Application Priority Data

Feb. 20, 1979 [CA]  Canada ................................ 321962

[51] Int. Cl.⁴ ............................................. H02G 3/08
[52] U.S. Cl. ........................ 174/65 R; 220/3.2; 439/449
[58] Field of Search ............. 174/65 R, 53, 58; 220/3.2

[56]  References Cited
U.S. PATENT DOCUMENTS

| | | | |
|---|---|---|---|
| Re. 23,720 | 10/1953 | Gillespie | 285/162 |
| 2,556,977 | 6/1951 | Paige | 285/128 |
| 2,706,647 | 4/1955 | Gillespie | 285/162 |
| 3,082,023 | 3/1963 | Rudolph et al. | 285/128 |
| 3,112,938 | 12/1963 | Karlin | 285/128 |
| 3,176,869 | 4/1965 | Kinney | 174/58 X |
| 3,863,037 | 1/1975 | Schindler et al. | 174/53 |
| 3,876,821 | 4/1975 | Pringle | 174/53 |
| 4,202,457 | 5/1980 | Tansi | 220/3.3 |
| 4,366,343 | 12/1982 | Slater et al. | 174/65 R |

FOREIGN PATENT DOCUMENTS

| | | |
|---|---|---|
| 486331 | 9/1952 | Canada . |
| 577589 | 6/1959 | Canada . |
| 658727 | 3/1963 | Canada . |
| 658728 | 3/1963 | Canada . |
| 2259667 | 6/1974 | Fed. Rep. of Germany . |

*Primary Examiner*—Leo Picard

[57]  ABSTRACT

An electrical box. The box has a cable inlet opening. A flap is mounted within the opening at a first edge of the opening to tend to resile to the closed position. An indent in the edge of the flap, remote from the mount, contacts and grips a cable when such a cable is positioned in the inlet opening. The edge of the opening adjacent the indent is substantially non-deformable by a cable forced into the inlet. The box can be molded in one piece in most embodiments and a cable can be positioned in it without the use of tools.

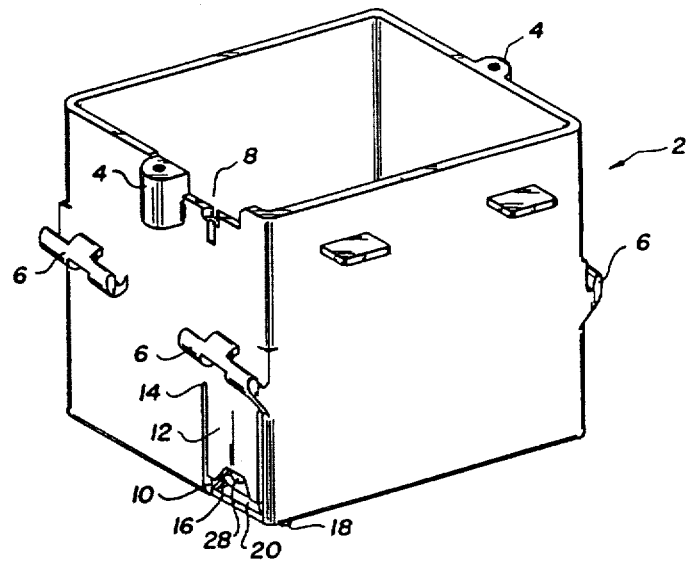

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 7 are determined to be patentable as amended.

Claims 2-6, dependent on an amended claim, are determined to be patentable.

New claims 8 and 9 are added and determined to be patentable.

1. An electrical box molded in one piece from a plastic material and comprising:
   a cable inlet opening formed in the box;
   a *plastic* flap *integrally molded with said box and* positioned within the opening and resiliently hingely mounted at a first edge of the opening to tend to resile to the closed position;
   stops positioned within the box to restrict the inward movement of the flap;
   an indent in the edge of the flap, remote from the hinged mount, to contact and grip a cable when such a cable is positioned in the inlet opening; *and*
   a lip projecting into the box from that edge of opening remote from the first edge of the opening, the flap acting to force the cable against the lip; [and]
   the edge of the opening adjacent said indent being substantially non-deformable by a cable forced into the inlet;
   *wherein said flap and said lip coact to substantially close off said inlet opening when said cable is in said inlet.*

7. An electrical box of a plastic material molded in one piece and comprising an opening adjacent a corner of the box forming a cable inlet opening into the box;
   a first *plastic* flap *integrally molded with said box and* positioned within the opening and resiliently hingedly mounted at a first edge of the opening to tend to resile to the closed position;
   an indent in the edge of the flap, remote from the hinged mount, to contact and grip a cable when such a cable is positioned in the opening;
   a second *plastic* flap *integrally molded with said first flap and* positioned in the indent to help seal the box;
   an edge projecting into the box from a position just inside the box, behind the cable inlet opening and remote from the first edge of the opening;
   a reinforcing rib formed on the exterior of the box opposite the edge; and
   stops positioned within the box to prevent the excessive inward movement of the resiliently hinged flap;
   *wherein said first and second flaps coact with said edge to substantially close off said inlet opening when said cable is in said inlet.*

*8. An electrical box of a plastic material molded in one piece which defines an opening adjacent a corner of the box to form a cable inlet opening into the box;*
   *a plastic flap integrally molded with said box and positioned within the opening and resiliently hinged at a first edge of the opening to tend to resile to the closed position;*
   *an indent means integrally molded into said flap to contact and grip a cable when such a cable is positioned in the opening, said means positioned remote from the hinged mount,*
   *a wall formed in the interior of the box adjacent one side of the opening to cooperate with said flap to prevent the ingress of contaminants or foreign objects;*
   *an edge projecting into the box from a position just inside the box, behind the cable inlet opening and remote from the first edge of the opening; the edge of the opening adjacent said indent being substantially nondeformable by a cable forced into the inlet;*
   *stops positioned within the box to prevent the excessive inward movement of the resiliently hinged flap;*
   *wherein said flap and said wall coact with said edge to substantially close off said inlet opening when said cable is in said inlet.*

*9. An electrical box of a plastic material molded in one piece which defines an opening adjacent a corner of the box to form a cable inlet opening into the box;*
   *a plastic flap integrally molded with said box and positioned within the opening and resiliently hinged at a first edge of the opening to tend to resile to the closed position;*
   *a gripping means integrally molded into said flap, said means including at least one indent means to contact and grip a cable when such a cable is positioned in the opening, said means positioned remote from the hinged mount;*
   *said gripping means also including an edge projecting into the box from a position just inside the box, behind the cable inlet opening and remote from the first edge of the opening, the edge of the opening adjacent said indent being substantially nondeformable by a cable forced into the inlet;*
   *a wall formed in the interior of the box adjacent one side of the opening to cooperate with said flap to prevent the ingress of contaminants or foreign objects;*
   *stop means positioned within the box to prevent the excessive inward movement of the resiliently hinged flap;*
   *wherein said flap and said wall coact with said edge to substantially close off said inlet opening when said cable is in said inlet.*

* * * * *